United States Patent [19]
Shirasaka

[11] Patent Number: 5,404,429
[45] Date of Patent: Apr. 4, 1995

[54] FIGURE PROCESSING APPARATUS

[75] Inventor: Akifumi Shirasaka, Yokohama, Japan

[73] Assignee: Canon Kabushiki Kaisha, Tokyo, Japan

[21] Appl. No.: 75,339

[22] Filed: Jun. 11, 1993

Related U.S. Application Data

[63] Continuation of Ser. No. 433,606, Nov. 8, 1989, abandoned.

[30] Foreign Application Priority Data

Nov. 11, 1988 [JP] Japan ................................. 63-283872

[51] Int. Cl.⁶ ............................................. G06F 15/72
[52] U.S. Cl. ..................................................... 395/135
[58] Field of Search ............... 395/129, 135, 141, 142, 395/143; 364/200 MS File, 900 MS File; 345/117, 118

[56] References Cited

U.S. PATENT DOCUMENTS

| | | | |
|---|---|---|---|
| 4,677,575 | 6/1987 | Redin | 364/521 |
| 4,807,143 | 2/1989 | Matsura | 364/468 |
| 4,930,092 | 5/1990 | Reilly | 364/522 |
| 4,958,301 | 9/1990 | Kobayashi | 364/521 |
| 4,965,752 | 10/1990 | Keith | 364/522 |
| 4,974,172 | 11/1990 | Nakai | 364/521 |

Primary Examiner—Phu K. Nguyen
Attorney, Agent, or Firm—Fitzpatrick, Cella, Harper & Scinto

[57] ABSTRACT

A figure processing apparatus is arranged to draw a locus figure in a form in which line ("effect line") is added to an original figure to enhance a desired visual effect. A first holding part holds a figure in a bitwise expanded form, a second holding part holds an effect figure which is formed of feature points (e.g., vertices or turning points) of the original figure, and a continuously drawing part repeats the step of drawing the figure held in the first holding part and the effect figure held in the second holding part in mutually different colors or densities. An additional arrangement extracts feature points which form the effect figure held in the second holding part.

25 Claims, 4 Drawing Sheets

FIGURE PROCESSING APPARATUS

This application is a continuation of application Ser. No. 07/433,606, filed Nov. 8, 1989, now abandoned.

BACKGROUND OF THE INVENTION

1. Field of the Invention

The present invention relates generally to figure processing apparatus and, more particularly, to a figure processing apparatus arranged to draw a locus figure by causing an original figure to continuously travel.

2. Description of the Related Art

A conventional type of figure processing apparatus having the function of displaying a figure in a graphically emphasized form is commonly arranged in the following manner. For example, if an original figure such as that shown in FIG. 4 is to be shadowed, the original figure is made to travel in pixel-by-pixel fashion in an expanded bit plane in the desired direction while the logical OR of the previous locus figure and the current locus figure is being sequentially obtained along the locus of figure travel. In this manner, a figure such as that shown in FIG. 5 can be obtained.

In the above-described conventional arrangement, however, since the continuous drawing of the figure is performed on the basis of the logical OR alone, the drawing process cannot reflect information on any inflection point of the outline of the original figure, with the result that no strong emphasis effect can be obtained.

SUMMARY OF THE INVENTION

It is therefore an object of the present invention to provide a figure processing apparatus from which the aforesaid disadvantage of the conventional apparatus is eliminated.

It is another object of the present invention to provide a figure processing apparatus capable of drawing an effect line based on the locus of a continuously traveling figure.

To achieve the above objects, in accordance with the present invention, there is provided a figure processing apparatus for drawing a locus figure based on a continuously traveling figure by continuously drawing the latter figure in a bit plane. The apparatus is arranged to draw the locus figure in a form in which an effect line is added to an original figure, and is provided with first holding means for holding a figure in a bitwise expanded form, second holding means for holding an effect figure which is formed of feature points of the figure in correspondence with the aforesaid figure, and continuously drawing means for repeating the step of drawing the figure held in the first holding means and the effect figure held in the second holding means in mutually different colors or densities.

In accordance with the present invention, there is also provided another figure processing apparatus for drawing a locus figure based on a continuously traveling figure by continuously drawing the latter figure in a bit plane. The apparatus is arranged to draw the locus figure in a form in which an effect line is added to an original figure, and is provided with first holding means for holding a figure in a bitwise expanded form, feature extracting means for extracting feature points of an effect figure on the basis of the figure held in the first holding means, second holding means for holding the effect figure formed of the feature points of the figure, continuously drawing means for repeating the step of drawing the figure held in the first holding means and the effect figure held in the second holding means in mutually different colors or densities.

In accordance with the present invention, it is possible to provide a figure processing apparatus capable of drawing an effect line which is added to a locus figure based on a continuously traveling figure.

DESCRIPTION OF THE PREFERRED EMBODIMENT

An embodiment of the present invention will be explained below in detail with reference to the accompanying drawings.

Figure 1:
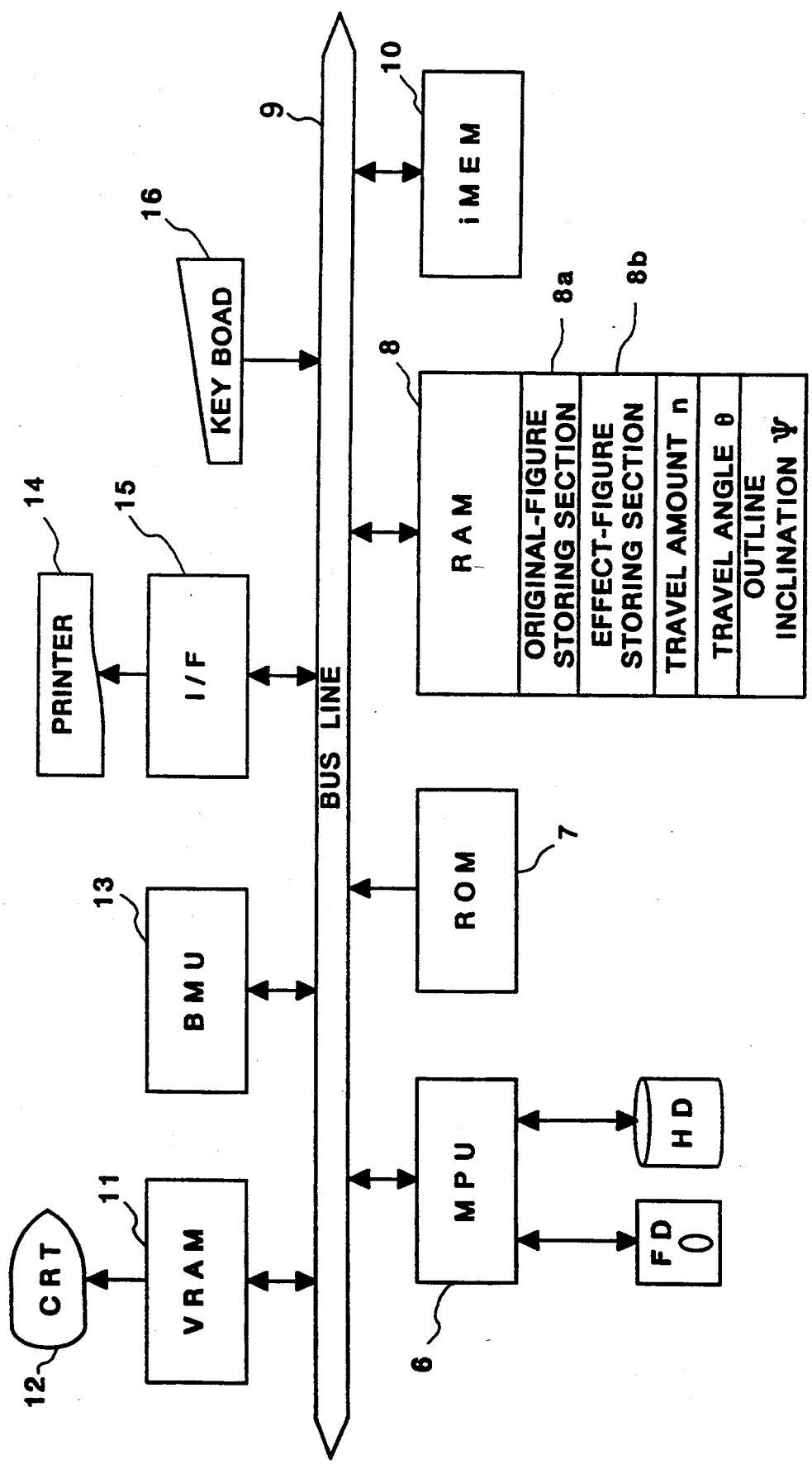
FIG. 1 is a block diagram showing the construction of an embodiment of a figure processing apparatus according to the present invention.

FIG. 1 shows the essential construction of the embodiment of a figure processing apparatus according to the present invention. In this Figure, a main processing unit ("MPU") 6 for controlling all the elements of this figure processing apparatus is shown. The MPU 6 serves to draw a locus figure based on a continuously traveling figure in accordance with the flow charts of FIGS. 2 and 3. External memory devices such as a floppy disk (FD) device, a hard disk (HD) device and so on are connected to the MPU 6. A read-only memory ("ROM") 7 stores various kinds of control programs and programs for drawing a locus figure based on a continuously traveling figure such as that shown in FIG. 2 or 3. A random access memory ("RAM") 8 temporarily stores various kinds of data such as character data which is input over a bus line 9. The RAM 8 is provided with an original-figure storing section 8a for storing the basic pattern of a figure to be expanded and an effect-figure storing section 8b, or a travel amount n which represents the amount by which the figure is made to travel, a travel angle $\theta$ which represents the angle at which the figure is made to travel, or the inclination $\Psi$ of an outline which is used in the program for drawing a locus figure based on the continuously traveling figure. This program will be further explained below. An image memory ("IMEM") 10 serves to store image data. A bit plane, which will also be described below, can be expanded in the aforesaid RAM 8 and the IMEM 10.

A video memory ("VRAM") 11 is arranged so that data to be displayed on a CRT display device 12 is expanded on a bit map. For example, if data to be displayed is character data, a character corresponding to the code of the character data is expanded in the VRAM 11. A cursor is directly generated in the display area of the VRAM 11 under the control of the MPU 6 so that a visual display of the cursor can be provided. A bit manipulation unit ("BMU") 13 having a DMA function enables data to be transferred between input and output devices such as the RAM 8, the VRAM 11, a printer 14 and so on without the use of the MPU 6. An interface 15 is disposed between and connects the printer 14 and the bus line 9. A keyboard 16 is shown with which various kinds of data, commands or the like can be input.

Figure 2:
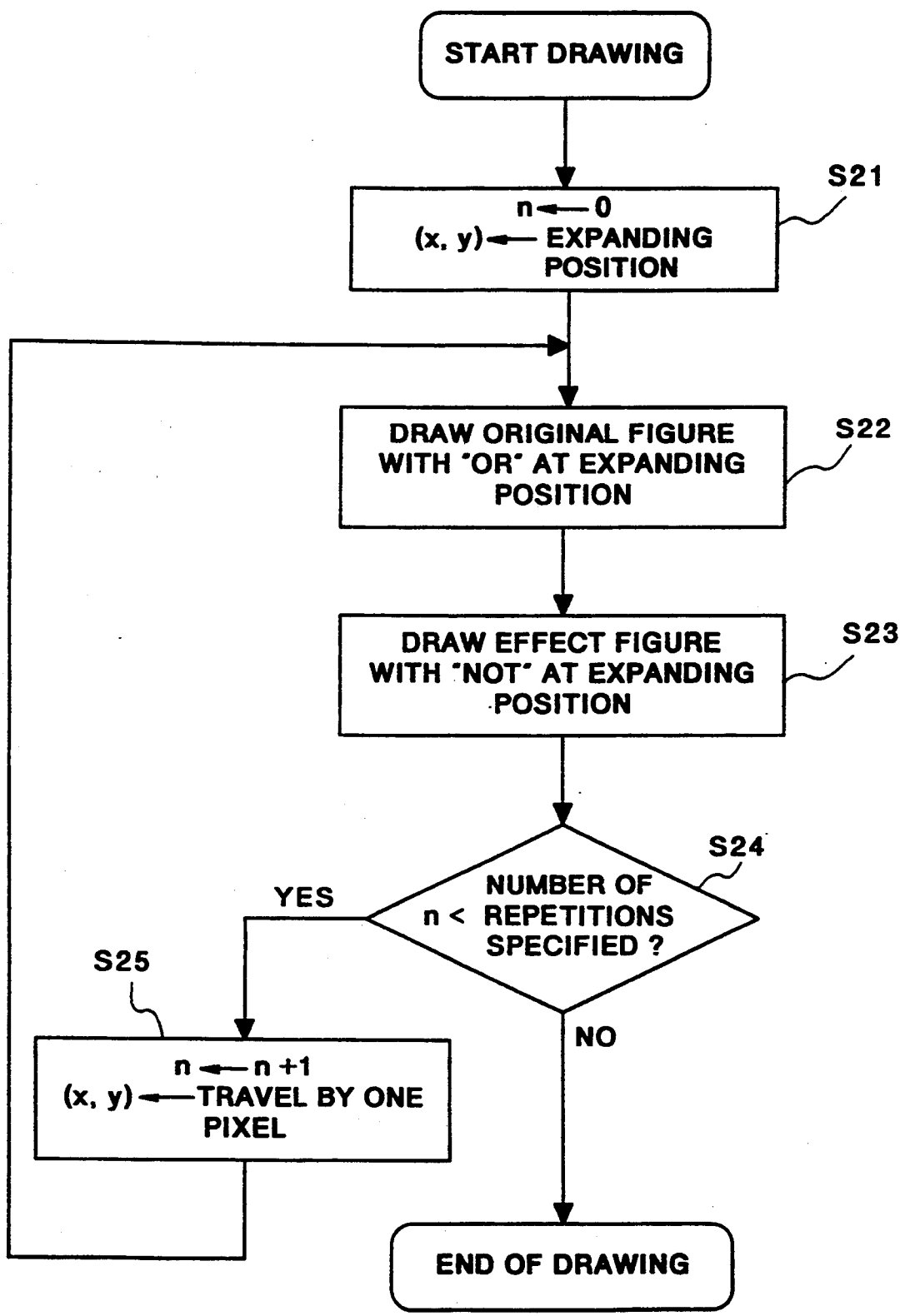
FIG. 2 is a flow chart showing a procedure for drawing a locus figure based on a continuously traveling figure according to the embodiment of FIG. 1.
Figure 3:
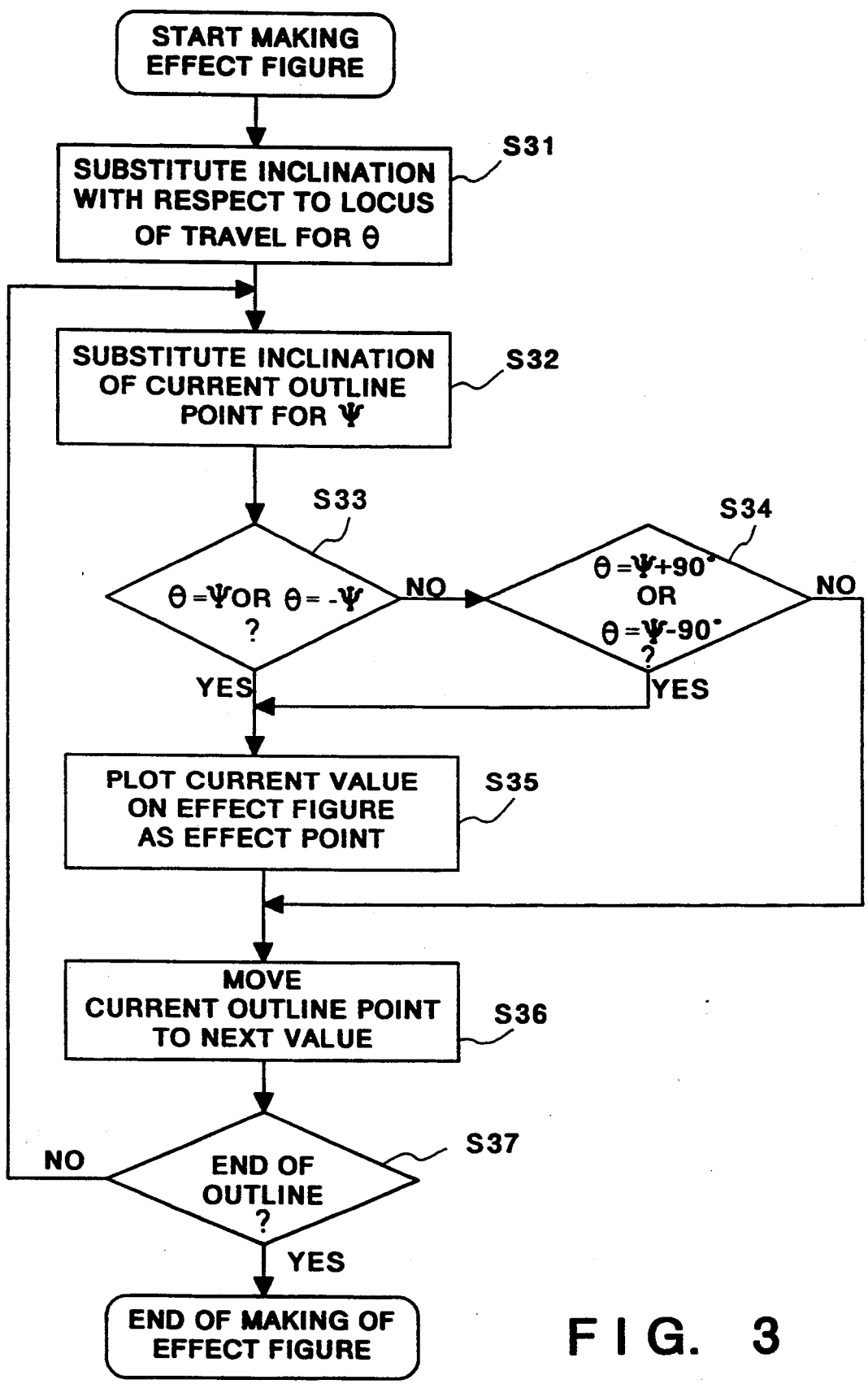
FIG. 3 is a flow chart showing a procedure for preparing an effect figure in the embodiment of FIG. 1.

A process for drawing a locus figure based on a continuously traveling figure by means of the figure processing apparatus having the above-described arrangement and construction, will be explained with reference to the algorithms shown in the flow chart of FIG. 2. This embodiment is explained with illustrative reference to an example in which an original figure in an image plane, such as the image shown in FIG. 4, is made to continuously travel to prepare the locus figure of FIG. 5 and an effect line is then added to the locus figure of FIG. 5, thereby providing the locus figure based on the continuously traveling figure such as that shown in FIG. 6.

CASE WHERE EFFECT FIGURE IS PREPARED IN ADVANCE

Figure 4:
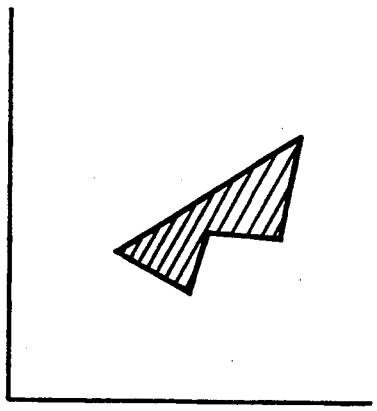
FIG. 4 is a view showing one example of an original figure which is to be made to continuously travel.
Figure 5:
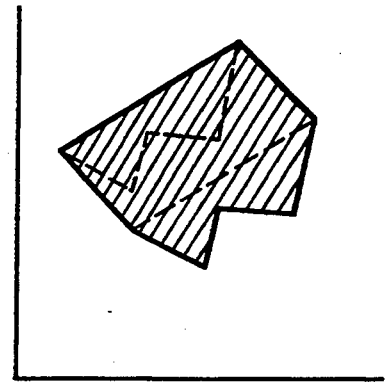
FIG. 5 is a view showing one example of a figure which is obtained when the figure of FIG. 4 is made to continuously travel.
Figure 6:
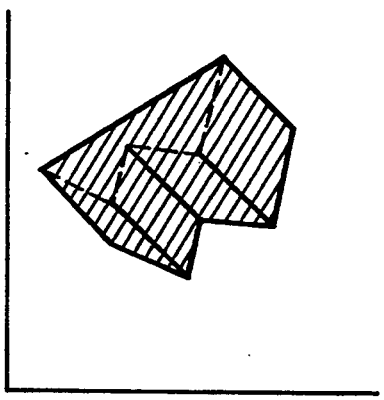
FIG. 6 is a view showing one example of a figure in which an effect line is added to the figure of FIG. 5.
Figure 7:
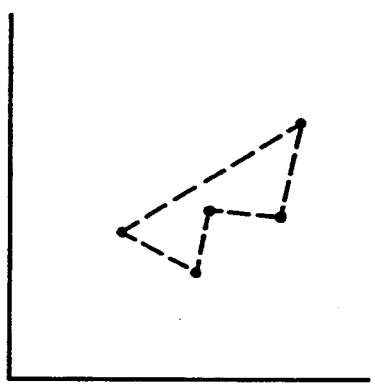
FIG. 7 is a view showing one example of an effect figure corresponding to the figure of FIG. 4.

It may be assumed that the original figure of FIG. 4 and the corresponding effect figure of FIG. 7 are prepared in advance. In this case, the process proceeds to Step S21, where the travel amount n is set to "0" and an initial expanding position is substituted for an expanding reference position (x, y). In Step S22, the original figure is expanded at this expanding reference position in an image plane on the basis of logical OR. Thereafter, in Step S23, at the same expanding reference position, the effect figure is drawn in the image plane on the basis of logical NOT. It is only necessary that the effect figure be drawn in a form distinguishable from the original figure. For instance, it is sufficient to merely make the effect figure different from the original figure in density or color. The process then proceeds to Step S24, where it is determined whether the travel amount n has reached the number of repetitions specified. If it is determined that the travel amount n has not yet reached the number of repetitions specified, the process proceeds to Step S25, where the expanding reference position (x, y) is shifted by one pixel while the value of n is counted up. In this manner, Steps S22–S25 are repeated until the travel amount n reaches the number of repetitions specified, whereby the continuously traveling figure of FIG. 6 is obtained.

CREATION OF EFFECT FIGURE

Figure 8:
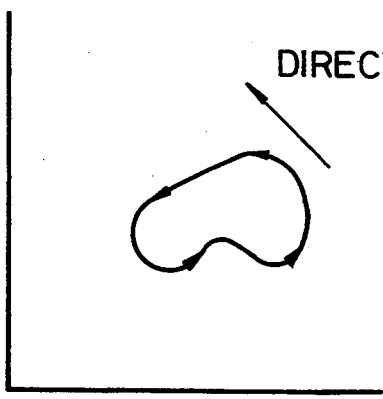
FIG. 8 is a view showing one example of an original figure which is represented by an outline.
Figure 9:
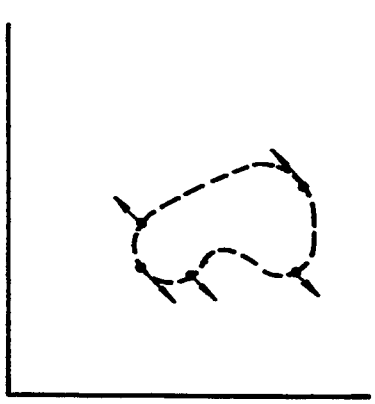
FIG. 9 is a view showing one example of an effect figure corresponding to the figure of FIG. 8.

In the embodiment explained in connection with the flow chart of FIG. 2, the effect figure is given in advance in the form of, for example, an external input. However, such an effect figure may be arbitrarily created. When an effect figure is to be created, a point representing each corner is extracted (herein termed feature points, as shown in FIG. 7. However, there may also be a corner-less figure such as that shown in FIG. 8. In such case, a process for creating an effect figure on the basis of an original figure, given outline information and information indicating the direction of continuous travel, is executed in accordance with the algorithms shown in the flow chart of FIG. 3. In the following explanation, reference is made to an example in which an effect figure such as that shown in FIG. 9 is created from an original figure which is represented by outline information in the manner shown in FIG. 8.

Initially, in Step S31, the angle of the direction in which the figure is made to travel is substituted for $\theta$. Then, in Step S32, at a starting point of the outline of the original figure, the inclination of that point of the outline is substituted for $\Psi$. If it is determined in Step S33 that $\theta = \Psi$ or $\theta = -\Psi$, the process proceeds to Step S35, where that point is plotted in the effect figure as an effect point. Otherwise, if it is determined in Step S34 that $\theta = \Psi + 90°$ or $\theta = \Psi - 90°$, the process likewise proceeds to Step S35, where the outline point is plotted in the effect figure as an effect point. Then, in Step S36, the process advances to the next outline point along the outline, and the process returns from Step S37 to Step S32 so that the process of re-substituting for $\Psi$ the inclination of the outline and comparing $\theta$ with $\Psi$, is repeated until the end point of the outline is reached (the starting point if a closed loop is to be traversed).

As is apparent from the foregoing, when a locus figure is to be obtained through continuous traveling of an original figure, an effect line can be drawn on the figure merely by drawing a corresponding effect figure in the alternate sequence described above. In addition, from the original figure, given outline information, an effect figure can be automatically created merely by arithmetic operations.

The present embodiment has been explained with reference to the example in which a locus of travel draws a straight line (i.e., the figure is to be moved along a straight path from on position to another), but it is also possible to draw a locus of travel of an arbitrary shape, as required. In the present embodiment, although one original figure is made to continuously travel, it is also possible to execute various processes such as reduction, enlargement, rotation and so on by affine transformation at the same time that the original figure is made to travel. In addition, it is possible to change the density of the original figure and/or the effect figure during traveling.

In the example of creating an effect figure, the same process is executed in both the case where the inclination is $\theta = \Psi$ or $\theta = -\Psi$ and the case where the inclination is $\theta = \Psi + 90°$ or $\theta = \Psi - 90°$. However, different types of processing of density or the like may be performed for these cases. In the present embodiment, only when the inclination coincides with a certain value, a corresponding point extracted as a feature point. However, a figure consisting of straight lines alone as shown in FIG. 7 can likewise be processed if the inclination at each apex of the figure continuously changes. In addition, it is possible to create an effect figure the density of which is changed on a stepwise basis from a portion near a point where the inclination is $\Psi = \theta$ or $\Psi = -\theta$ or the inclination is $\Psi = \theta + 90°$ or $\Psi = \theta - 90°$.

What is claimed is:

1. A figure processing apparatus for drawing a three-dimensional figure in a bit plane, said apparatus comprising:
   first holding means for holding an original plane figure represented by bit map data;
   second holding means for holding a set of discrete feature points selected from the original plane figure so that the set of discrete feature points satisfy one or more predetermined conditions;

drawing means for drawing the original plane figure held in said first holding means in the bit plane on the basis of performing a logical OR at a present drawing position with respect to a previous drawing position, and then drawing the set of discrete feature points held in said second holding means in the bit plane on the basis of performing a logical NOT at the same present drawing position with respect to the same previous drawing position; and continuously-drawing means for repeating the drawing by said drawing means in response to a shift of the drawing position in such a manner that the set of discrete feature points can be distinguished from the original plane figure while causing a drawing position to travel in order to draw a three-dimensional figure in the bit plane.

2. A figure processing apparatus according to claim 1, wherein the feature points of the set of discrete feature points are selected from an outline of the original figure.

3. A figure processing apparatus according to claim 2, wherein the feature points of the set of discrete feature points are selected from the outline of the original plane figure in accordance with a direction in which the drawing position travels.

4. A figure processing apparatus according to claim 1, wherein the discrete feature points are singular points where a direction of a normal line or a tangent line of the original plane figure is approximately equal to a direction of continuous traveling of the original plane figure.

5. A figure processing apparatus according to claim 4, wherein the singular point is a corner of the original plane figure.

6. A figure processing apparatus according to claim 1, wherein said continuously-drawing means includes color/density assigning means for assigning different colors or densities to the original plane figure and the set of discrete feature points.

7. A figure processing apparatus according to claim 6, wherein said continuously-drawing means further comprises color/density changing means for sequentially changing color or density of the set of discrete feature points to distinguish the set of discrete feature points from the original plane figure.

8. A figure processing apparatus for drawing a three-dimensional figure, said apparatus comprising:

first holding means for holding the original plane figure represented by bit map data;

discrete feature points extracting means for extracting a set of discrete feature points selected from the original plane figure held in said first holding means in such a manner that the set of discrete feature points satisfy one or more predetermined conditions;

second holding means for holding the set of discrete feature points in correspondence with the original plane figure;

drawing means for drawing the original plane figure held in said first holding means in the bit plane on the basis of performing a logical OR at a present drawing position with respect to a previous drawing position, and then drawing the set of discrete feature points held in said second holding means in the bit plane on the basis of performing a logical NOT at the same present drawing position with respect to the same previous drawing position; and continuously-drawing means for repeating the drawing by said drawing means in response to a shift of the drawing position so that the set of discrete feature points can be distinguished from the original figure while causing a drawing position to travel in order to draw a three-dimensional figure in the bit plane.

9. A figure processing apparatus according to claim 8, wherein said discrete feature points extracting means extracts as a feature point a singular point where a direction of a normal line or a tangent line of the original plane figure is approximately equal to a direction of continuous traveling of the original plane figure held in said first holding means.

10. A figure processing apparatus according to claim 9, wherein the singular point is a corner of the original plane figure.

11. A figure processing apparatus according to claim 8, wherein said continuously-drawing means includes color/density assigning means for assigning different colors or densities to the original plane figure and the set of discrete feature points.

12. A figure processing apparatus according to claim 8, wherein said discrete feature points extracting means extracts the set of discrete feature points based on an outline of the original plane figure held in said first holding means and a direction in which the drawing position is to be made to travel.

13. A figure processing apparatus according to claim 11, wherein said continuously-drawing means further comprises color/density changing means for sequentially changing color or density of the set of discrete feature points to distinguish the set of discrete feature points from the original plane figure.

14. A method of drawing a three-dimensional figure, comprising the steps of:

holding an original figure represented by bit map data;

holding a set of discrete feature points of the original figure selected from the original plane figure in such a manner that the set of discrete feature points satisfy one or more predetermined conditions;

drawing the held original plane figure on the basis of performing a logical OR at a present drawing position with respect to a previous drawing position, and then drawing the held set of discrete feature points on the basis of performing a logical NOT at the same present drawing position with respect to the same previous drawing position; and repeatedly performing said step of drawing in responce to a shift of the drawing position so that the set of discrete feature points can be distinguished from the original figure while causing a drawing position to travel in order to draw a three-dimensional figure in the bit plane.

15. A method according to claim 14, further comprising the step of sequentially changing color or density of the set of discrete feature points during said step of repeating to draw to distinguish the set of discrete feature points from the original plane figure.

16. A method according to claim 14, wherein the feature points of the set of discrete feature points are selected from an outline of the original plane figure.

17. A method according to claim 16, wherein the feature points of the set of discrete feature points are selected from the outline of the original plane figure in accordance with a direction in which the drawing position travels.

18. A method according to claim 14, wherein the feature points of the set of discrete feature points are singular points of the original plane figure where a direction of a normal line or a tangent line of the original plane figure is approximately equal to a direction of continuous traveling.

19. A method according to claim 14, further comprising the step of assigning different colors or densities to the original plane figure and the set of discrete feature points before or while said step of repeatedly drawing is performed.

20. A method of drawing a three-dimensional figure comprising the steps of:
holding an original plane figure represented by bit map data;
extracting a set of discrete feature points selected from the original plane figure held in said holding step in such a manner that the set of discrete feature points satisfy one or more predetermined conditions;
holding the set of discrete feature points;
drawing the held original plane figure on the basis of performing a logical OR at a present drawing position with respect to a previous drawing position, and then drawing the held set of discrete feature points on the basis of performing a logical NOT at the same present drawing position with respect to the same previous drawing position; and
repeatedly performing said step of drawing in response to a shift of the drawing position so that the set of discrete feature points can be distinguished from the original figure while causing a drawing position to travel in order to draw a three-dimensional figure in the bit plane.

21. A method according to claim 20, wherein, in said step of extracting, a singular point where a direction of a normal line or a tangent line of the original plane figure is approximately equal to a direction of continuous traveling of a figure of the original plane figure represented by bit map data is extracted as a feature point.

22. A method according to claim 20, wherein, in said step of extracting, the set of discrete feature points is extracted on the basis of the outline of the figure held in said original-figure-holding step and the direction in which the figure is made to travel.

23. A method according to claim 20, further comprising the step of sequentially changing color or density of the set of discrete feature points before or during said step of repeatedly drawing to distinguish the set of discrete feature points from the original plane figure.

24. A method according to claim 20, further comprising the step of assigning different colors or densities to the original plane figure and the set of discrete feature points before or while said step of repeatedly drawing is performed.

25. A method according to claim 21, wherein the singular point is a corner of the original plane figure.

* * * * *

UNITED STATES PATENT AND TRADEMARK OFFICE
CERTIFICATE OF CORRECTION

PATENT NO. : 5,404,429
DATED : April 4, 1995
INVENTOR(S) : AKIFUMI SHIRASAKA

Page 1 of 2

It is certified that error appears in the above-identified patent and that said Letters Patent is hereby corrected as shown below:

ON TITLE PAGE

In [57] ABSTRACT:
Line 2, "line" should read --a line--.

IN THE DRAWINGS

Sheet 1 of 4, "KEY BOAD" should read --KEYBOARD--.

COLUMN 1

Line 9, "to" should read --to a--.

COLUMN 3

Line 64, "points," should read --points),--.

COLUMN 4

Line 35, "on" should read --one--.
Line 43, "and/or" should read --and/or of--.
Line 51, "value, a" should read --value (illustratively $\theta$ or $\theta \pm 90°$), is a--.

UNITED STATES PATENT AND TRADEMARK OFFICE
CERTIFICATE OF CORRECTION

PATENT NO.   : 5,404,429
DATED        : April 4, 1995
INVENTOR(S)  : AKIFUMI SHIRASAKA It is certified that error appears in the above-identified patent and that said Letters Patent is hereby corrected as shown below:

COLUMN 8

Line 14, "figure" should read --original plane figure--.
    Line 16, "figure" should read --original plane figure--.

Signed and Sealed this

First Day of August, 1995

Attest:

BRUCE LEHMAN

Attesting Officer       Commissioner of Patents and Trademarks